United States Patent [19]

Mottate

[11] Patent Number: 5,125,281
[45] Date of Patent: Jun. 30, 1992

[54] DRIVE UNIT INCORPORATED LINEAR MOTION GUIDE ASSEMBLY

[75] Inventor: Tatsuo Mottate, Saitama, Japan

[73] Assignee: Nippon Thompson Co., Ltd., Tokyo, Japan

[21] Appl. No.: 632,297

[22] Filed: Dec. 20, 1990

[30] Foreign Application Priority Data

Dec. 21, 1989 [JP] Japan .................. 1-332419

[51] Int. Cl.⁵ .......................................... F16H 27/02
[52] U.S. Cl. ................................. 74/89.21; 384/50
[58] Field of Search ............... 74/37, 89.2, 89.21, 74/89.22; 384/50

[56] References Cited

U.S. PATENT DOCUMENTS

| | | | |
|---|---|---|---|
| 2,933,929 | 4/1960 | Rosendahl | 74/37 |
| 3,273,408 | 9/1966 | Nagel et al. | 74/37 |
| 3,400,594 | 9/1968 | Steyh | 74/37 |
| 3,518,889 | 7/1970 | McClean | 74/37 |
| 3,605,505 | 9/1971 | Gschwendtner | 74/37 |
| 4,082,007 | 4/1978 | Strickland | 74/89.21 |
| 4,290,317 | 9/1981 | Hehl | 74/89.2 |
| 4,453,072 | 6/1984 | Middleton, Jr. et al. | 74/89.22 X |
| 4,968,214 | 11/1990 | Shiotani | 74/89.2 X |
| 4,973,291 | 11/1990 | Mottate | 74/89.2 X |

*Primary Examiner*—Allan D. Herrmann
*Assistant Examiner*—David W. Laub
*Attorney, Agent, or Firm*—Skjerven, Morrill, MacPherson, Franklin & Friel

[57] ABSTRACT

A small-sized linear motion guide assembly includes a bed having a U-shaped cross section, a sliding table having a U-shaped cross section and a plurality of rolling members interposed between the bed and the sliding table to thereby provide a relative motion between the bed and the sliding table. A drive pulley is provided at one end of the bed and an idle pulley is provided at the other end with an endless timing belt extended between the drive and idle pulleys. The drive pulley is operatively coupled to a stepping motor so that when the motor is driven, the sliding table is caused to move relative to the bed.

5 Claims, 6 Drawing Sheets

025# DRIVE UNIT INCORPORATED LINEAR MOTION GUIDE ASSEMBLY

BACKGROUND OF THE INVENTION

1. Field of the Invention

This invention generally relates to a linear motion guide assembly suitable for use in various apparatuses and machines having movable parts, and, in particular, to a small-sized linear motion guide assembly incorporating therein its drive unit.

2. Description of the Prior Art

As shown in FIG. 7, a typical prior art linear motion guide assembly includes an elongated bed A having a U-shaped cross section formed with a pair of guide grooves and a sliding table B which is slidably mounted on the bed A with a plurality of rolling members interposed therebetween. Thus, the sliding table B may move linearly along the longitudinal direction of the elongated bed A back and forth. Typically, a rack and pinion type drive unit (not shown) is provided for driving to move the sliding table A relative to the bed A. However, such a prior art drive unit is relatively large in size, so that the overall size of the linear motion guide assembly tends to be bulky. Moreover, since there is a backlash in the mesh between the rack and the pinion, the accuracy in positioning the sliding table B is rather limited. Furthermore, since a rack and pinion drive unit tends to move the sliding table B upward, the rolling members interposed between the bed A and the sliding table B tend to be forced against the upper edge sections of the guide grooves, which tends to increase the sliding resistance and the wear of both of the bed A and the rolling members.

SUMMARY OF THE INVENTION

In accordance with the present invention, there is provided a linear motion guide assembly which includes an elongated bed having a first guide means, a sliding bed having a second guide means and a plurality of rolling means interposed between the first and second guide means so that the sliding table may move linearly back and forth relative to the bed. The present assembly also includes a pair of pulleys, each located at each end of the bed, and an endless power transmitting means extended between the pair of pulleys. One of the pair of pulleys is operatively coupled to a shaft of a motor. An attaching means is provided for attaching the power transmitting means to the sliding table, so that the sliding table may move relative to the bed when the pulleys are driven to rotatably the motor.

In the preferred embodiment, the bed is fixedly mounted on a base plate. The pair of pulleys includes an idle pulley, which is provided to be freely rotatable at one end of the bed, and a drive pulley which is fixedly mounted on a drive shaft of a motor which is fixedly in the base plate and the motor is mounted at the surface opposite to the surface where the bed is mounted with the drive shaft of the motor extending through the through-hole to locate the drive pulley at one end of the bed. Preferably, the endless power transmitting means is an endless belt having teeth at one side, and the attaching means includes a first member having indentations meshable with the teeth of the endless belt and a second member which causes a portion of the endless belt to be pressed against the surface of the first member having the indentations.

With this structure, since the power transmitting means run in parallel with the first and second guide means of the bed and the sliding table, no undesired force is applied between the rolling members and the first guide means of the bed. Therefore, the motion of the sliding table is extremely enhanced and a longer service life can be expected. In addition, the combination of pulleys and a power transmitting means, such as an endless belt, the overall size of the present linear motion guide assembly can be significantly reduced, in particular in height. Furthermore, since use may be made of a motor, such as a stepping motor, the accuracy in positioning the sliding table relative to the bed is significantly improved.

It is therefore a primary object of the present invention to provide an improved linear motion guide assembly incorporating a drive unit compact in size, light in weight and high in performance.

Another object of the present invention is to provide an improved linear motion guide assembly simple in structure, easy to manufacture and low at cost.

A further object of the present invention is to provide an improved linear motion guide assembly high in positioning accuracy and fast in operation.

Other objects, advantages and novel features of the present invention will become apparent from the considered in conjunction with the accompanying drawings.

DESCRIPTION OF THE PREFERRED EMBODIMENTS

Figure 1:
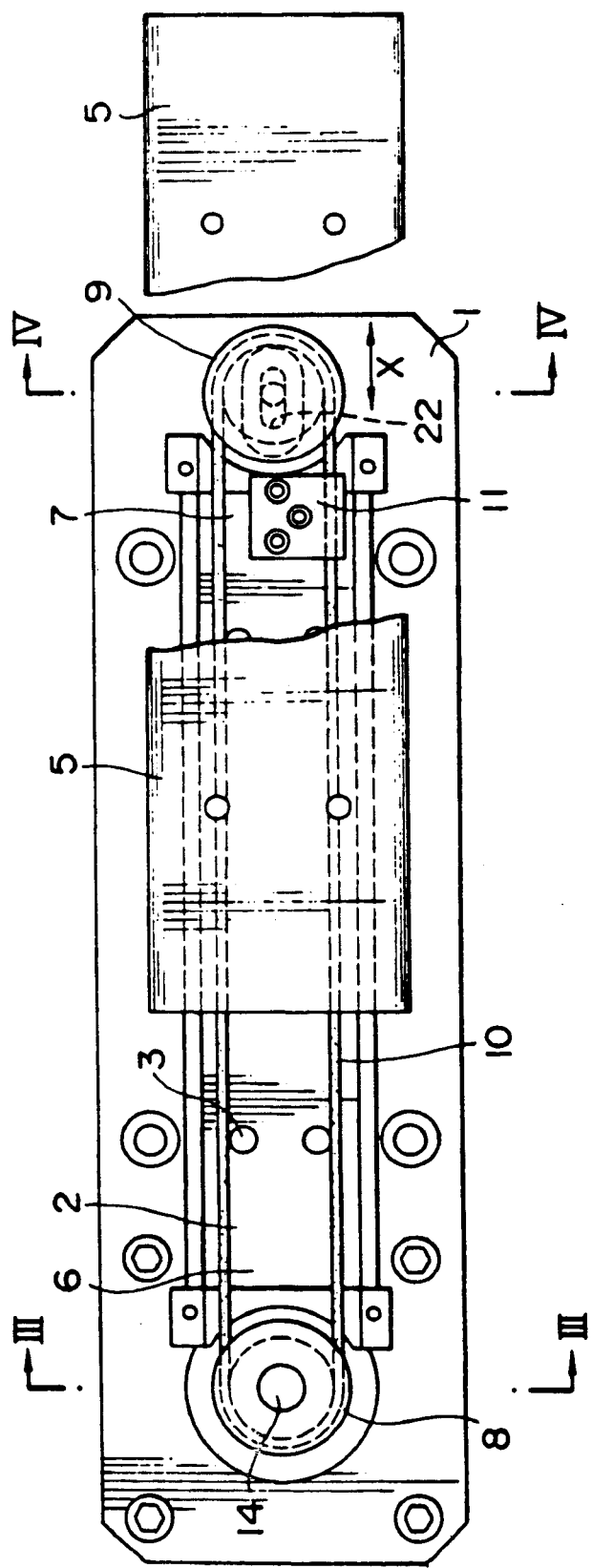
FIG. 1 is a schematic illustration showing in plan view a linear motion guide assembly constructed in accordance with one embodiment of the present invention.
Figure 2:
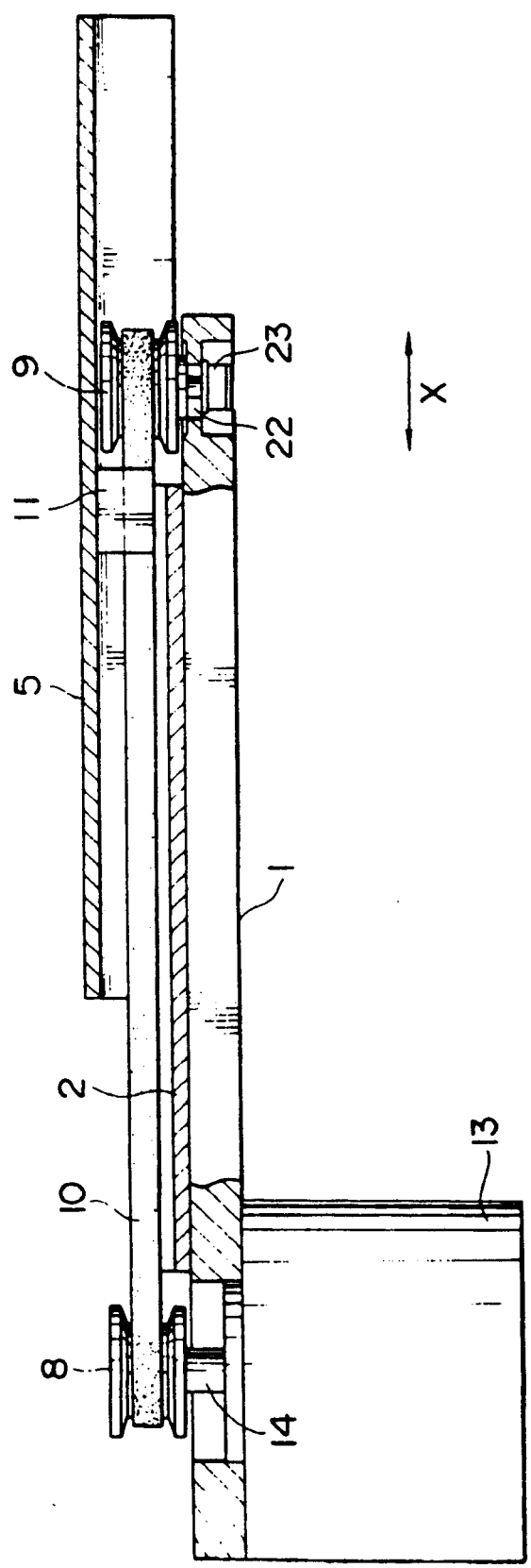
FIG. 2 is a schematic illustration showing in side elevation the assembly of FIG. 1.
Figure 3:
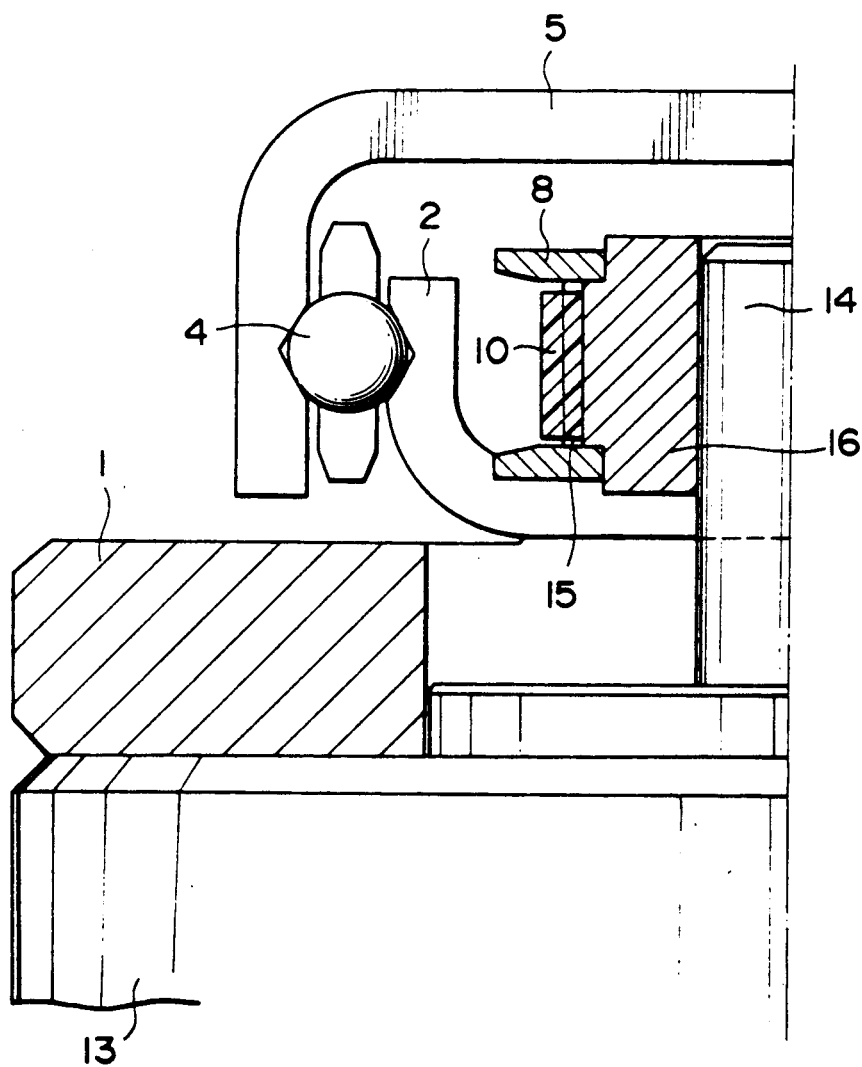
FIG. 3 is a fragmentary schematic illustration showing on a somewhat enlarged scale in end view a portion of the of FIG. 1.
Figure 4:
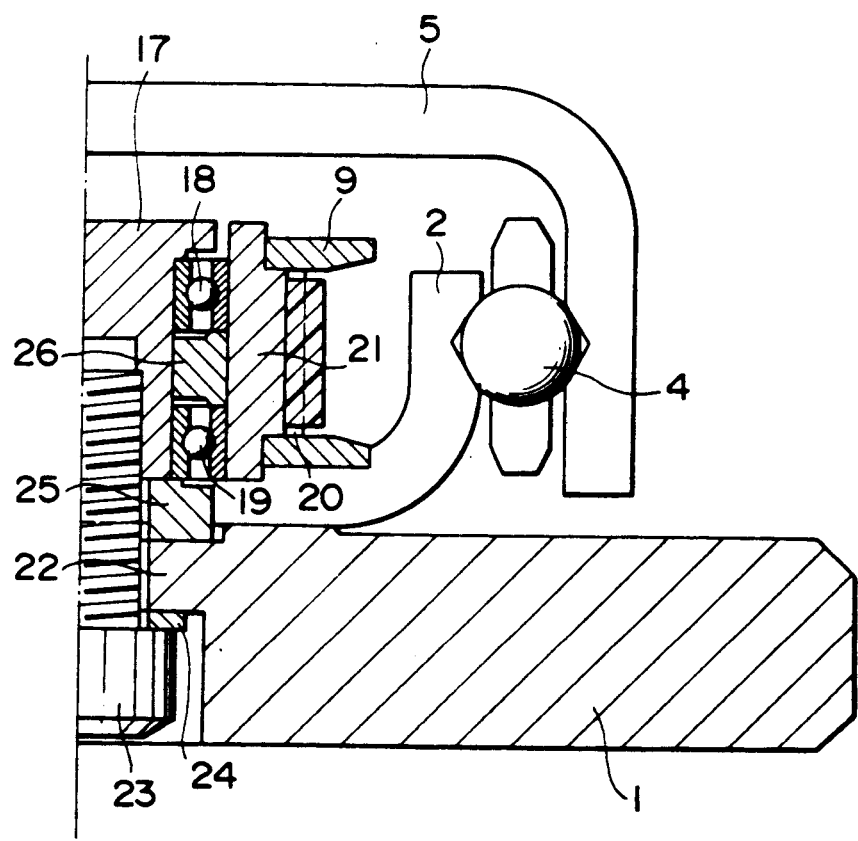
FIG. 4 is a fragmentary schematic illustration showing on a somewhat enlarged scale in end view a FIG. 5 is a fragmentary schematic illustration showing on a somewhat enlarged scale an attachment structure for attaching the belt to the sliding table in the assembly of FIG. 1.

Referring first to FIGS. 1 through 4, there is shown a linear motion guide assembly constructed in accordance with one embodiment of the present invention. As shown, in the illustrated embodiment, the assembly includes a base plate 1 which is generally flat and rectangular in shape, though the base plate 1 should not limited to such a particular shape and structure. An elongated bed 2 is fixedly mounted on a top surface of the base plate 1 by means of bolts 3. In the illustrated embodiment, the bed 2 has a generally U-shaped cross section as best shown in FIGS. 3 and 4, so that the bed 2 generally has a flat bottom wall section and a pair of vertical wall sections, each extending vertically upward from a corresponding side of the flat bottom wall section. In the illustrated embodiment, the height of the bed 2 is relatively low and thus the height of the vertical wall sections of the bed 2 is low. As best shown in FIGS. 3 and 4, a generally V-shaped inner guide groove is formed at the outer surface of each of the vertical wall sections. This inner guide groove extends straight along the longitudinal axis of the elongated bed 2.

The present linear motion guide assembly also includes a sliding table 5, which, in the illustrated embodiment, has a flat top wall section and a pair of vertical wall sections, each extending downward from a corresponding side of the flat top wall section, thereby defining a generally U-shaped cross section. In the illustrated embodiment, the width or distance between the two vertical wall sections of the sliding table 5 is larger than the width or distance between the two vertical walls sections of the bed 2 by a predetermined amount. A generally V-shaped outer guide groove is formed in an inner surface of each of the vertical wall sections of the sliding table. Thus, when assembled, the outer guide groove of the sliding table 5 is located opposite to the corresponding inner guide groove of the bed 2 to define a guide channel therebetween.

A plurality of balls 4 as rolling members are provided in the guide channel defined by the paired outer and inner guide grooves so that a rolling contact is provided between the bed 2 and the sliding table 5. Thus, the sliding table 5 can move linearly relative to the bed 2 back and forth. In the illustrated embodiment, a ball retainer for retaining the balls 4 spaced apart from each other is also provided between the vertical wall section of the bed 2 and the vertical wall section of the sliding table 5.

A drive pulley 8 is provided as located at one end of the elongated bed 2 and an idle pulley 9 is provided as located at the other end. A stepping motor 13 is fixedly mounted at the bottom surface of the base plate 1 and a drive shaft 14 of the motor 13 extends upward through a hole formed in the base plate 1. The drive pulley 8 is fixedly mounted on the drive shaft 14, so that the drive pulley 8 rotates when the motor 13 is energized. On the other hand, as will be described more in detail later, the idle pulley 9 is mounted on the base plate 1 to be freely rotatable. An endless timing belt 10 is extended between the drive pulley 8 and the idle pulley 9. In the illustrated embodiment, the sizes of the drive and idle pulleys 8 and 9 are chosen sections of the bed 2. Alternatively, the pulleys 8 and 9 may be so sized that the run sections of the endless timing belt 10 are located outside of the vertical wall sections of the bed 2.

An attachment member 11 is fixedly mounted on the sliding table 5 and the attachment member 11 may be secured to a selected portion of the endless timing belt 10 at a run section in the illustrated embodiment. With this structure, when the motor 13 is energized, the drive pulley 8 is driven to rotate, thereby causing the endless timing belt 10 to run in a selected direction. As a result, the sliding table 5 moves linearly relative to the bed 2 along with the movement of the timing belt 10.

In the above-described embodiment, the bed 2 is fixedly mounted on the base plate 1. However, the base plate 1 and the bed 2 may be integrally formed, if desired. For example, an extended section may be formed at each end of the bed 2 to define a mounting section for mounting the motor 13 and the idle pulley 9.

Figure 6:
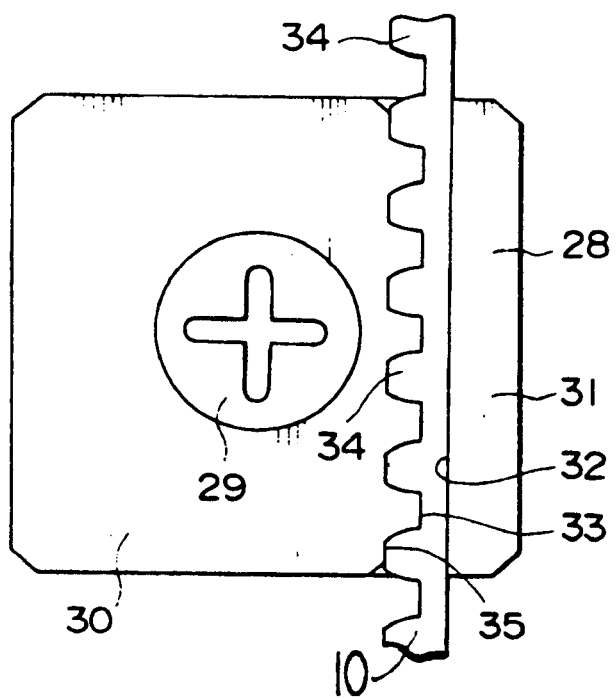
FIG. 6 a fragmentary schematic illustration showing on a enlarged scale in plan view the attachment structure shown in FIG. 5.
Figure 7:
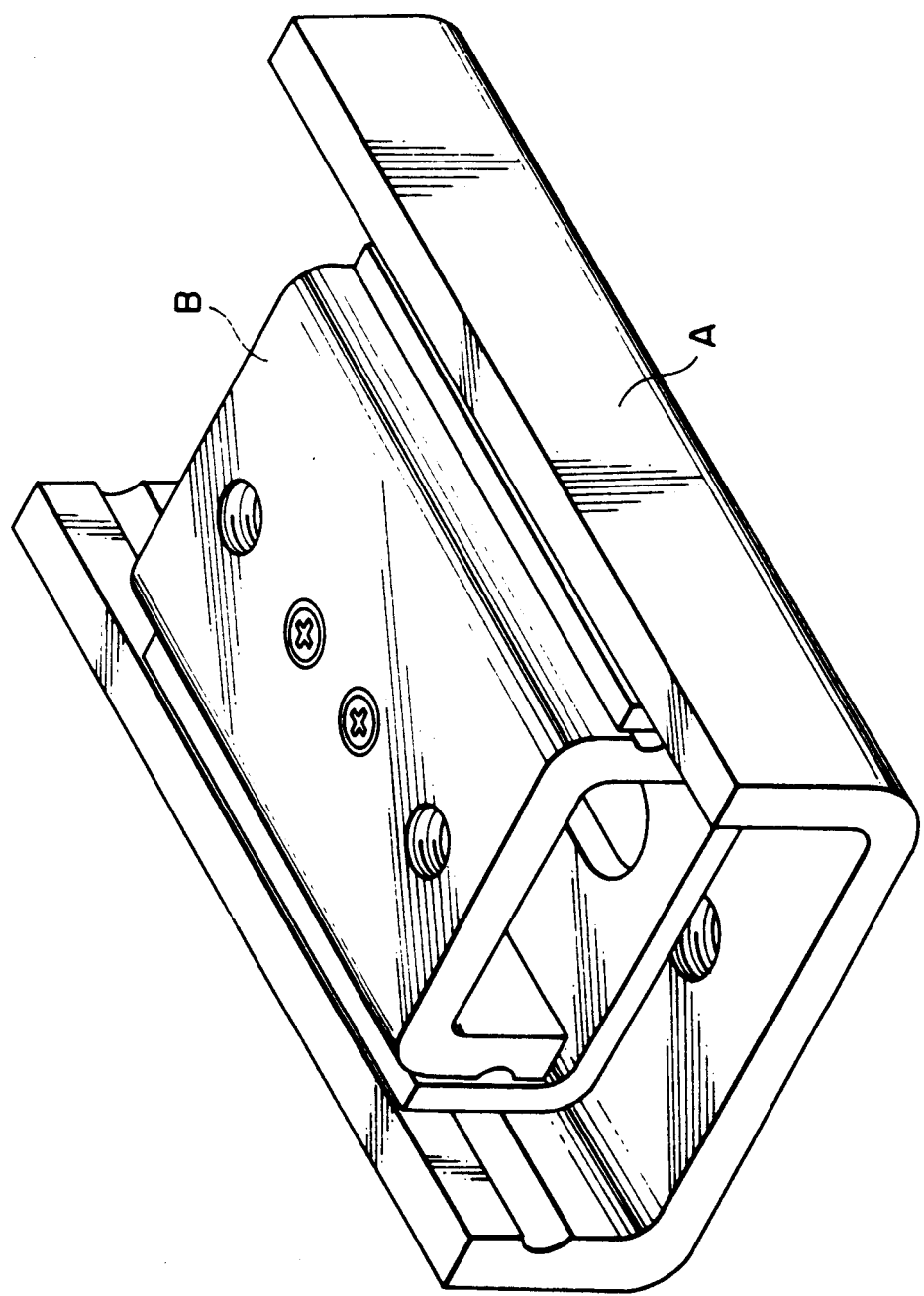
FIG. 7 is a schematic illustration showing in perspective view a typical prior art linear motion guide assembly.

FIG. 3 illustrates in detail how the drive pulley 8 is mounted on the drive shaft 14 of the motor 13. The drive pulley 8 has a hub section 16, which is tightly fitted onto the drive shaft 14, and teeth 15 are provided at the outer peripheral surface of the hub section 16. As best shown in FIG. 6, the endless timing belt 10 has an inner peripheral surface provided with teeth 34 and a relatively smooth outer peripheral surface. Thus, the teeth 34 of the timing belt 10 are in mesh with the teeth of the drive pulley 8 where the belt 10 extends around the drive pulley 8. As a result, when the drive pulley 8 is driven to rotate by the motor 13, the timing belt 10 is set in motion through engagement between the teeth 34 of the belt 10 and the teeth 15 of the drive pulley 8 (FIG. 3).

As best shown in FIGS. 2 and 4, a slot 22 is formed in the base plate 1 at a location near the end of the bed 2 opposite to the end where the drive pulley 8 is located. A bolt 23 extends through the slot 22 with its head located at the bottom, and the bolt 23 is threaded into a threaded hole formed in a stationary shaft 17. It is to be noted that the slot 22 is relatively large so that the bolt 23 may move within the slot 22 in the longitudinal direction as indicated by a double-arrow X. When the bolt 23 is tightened, the stationary shaft 17 is fixed in position. In this manner, the location of the stationary shaft 17 may be adjusted. This is set at any desired level by locating the position of the stationary shaft 17 at an appropriate position. A spacer 25 is also provided as a seat for the stationary shaft 17. Around the stationary shaft 17 are provided a pair of ball bearings 18 and 19 with a spacer 26 inbetween. The idle pulley 9 is mounted on the ball bearings 18 and 19 so that the idle pulley 9 may rotate around the stationary shaft 17 freely. The idle pulley 9 includes a hub section 21 which is mounted on the ball bearings 18 and 19, and teeth 20 are provided on the outer peripheral surface of the hub section 21. The teeth 20 are meshable with the teeth 34 of the belt 10. A washer 24 is shown in FIG. 4 as a seat for the head of the bolt 23.

Figure 5:
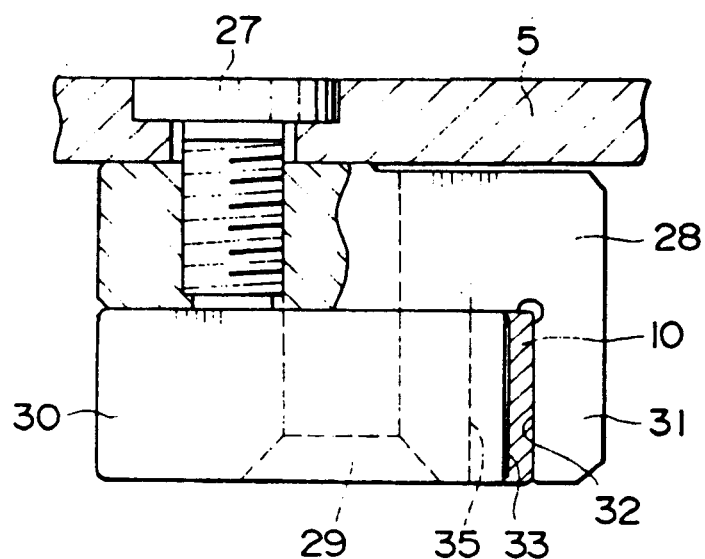

FIGS. 5 and 6 illustrate the attachment member FIGS. 1 and 2. In the illustrated embodiment, the attachment member 11 has a two-part structure, and, thus, it includes a first attachment sub-member 28, which is fixedly mounted on the sliding bed 5 by a bolt 27, and a second attachment sub-member 30, which is fixedly mounted on the first attachment sub-member 28 by a bolt 29. The first attachment sub-member 28 has a horizontal section and a holding section 31 which depends vertically downward from one side of the horizontal section. The holding section 31 defines a holding surface 32 at is one surface against which the outer smooth surface of the belt 10 may be brought into contact. The second attachment sub-member 30 has a shape generally commensurate with the shape of the horizontal section of the first attachment sub-member 28, and it is formed with teeth 35 at its end surface 33, which is meshable with the teeth 34 of the timing belt 10. Thus, when the second attachment sub-member 30 is secured to the first attachment sub-member 28 by tightening the bolt 29, the timing belt 10 is firmly gripped by the attachment member 11, whereby the timing belt 10 is attached to the sliding bed 2 through the attachment member 11.

Such a structure is advantageous because the attachment member 11 may be attached to any desired location of the timing belt 10 selectively without causing any permanent damage. Besides, there is no member 11 and thus the sliding bed 5. Thus, the motion or location of the sliding bed 5 relative to the bed 2 can be controlled at high accuracy without deterioration.

The timing belt 10 is preferably reinforced by incorporating reinforcing elements, such as glass fibers, piano wires, ceramics fibers or any other non-elastic fibers. However, the present invention should not be limited only to the use of such reinforcing fibers as long as the assembly is so structured that the tension of the timing belt 10 can be adjusted as described before. It should be noted that the present invention should not be limited only to the use of a timing belt as described above. Use may also be made of such a power transmitting members as V-belts, chains and non-slipping type wires and cables. In addition, use may be made of any other type of motor than the stepping motor 13.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

I claim:

1. A linear motion guide assembly comprising:
   a bed having at least one first guide groove extending straight in a first direction, said bed being elongated and having a generally U-shaped cross section;
   a sliding table having at least one second guide groove extending in parallel with and opposite to said first guide groove when assembled, said sliding table being elongated and having a generally inverted-U-shaped cross section so that an enclosed space is defined between said bed and said sliding table;
   a plurality of rolling members interposed between said first and second guide grooves so as to provide a relative sliding motion between said bed and said sliding table;
   a drive pulley located at a first end of said bed and operatively coupled to a drive shaft of a motor;
   an idle pulley located at a second end of said bed, which is opposite to said first end, said idle pulley being supported to be freely rotatable;
   a power transmitting means extending through said enclosed space between said drive pulley and said idle pulley; and
   attaching means for attaching said power transmitting means to said sliding table.

2. The assembly of claim 1, further comprising a base plate having a first surface on which said bed is fixedly mounted, said motor being mounted on a second surface of said base plate, which is opposite to said first surface, said drive pulley being fixedly mounted on the drive shaft of said motor and said idle pulley being rotatably supported at the first surface of said base plate.

3. The assembly of claim 1, wherein said power transmitting means includes an endless timing belt hving a first surface provided with teeth and a second surface which is relatively smooth.

4. The assembly of claim 1, wherein said power transmitting means includes an endless timing belt having a first surface provided with teeth of said timing belt being meshable with the teeth of each of said pulleys when brought into contact.

5. The assembly of claim 3, wherein said attaching means comprises a first section fixedly mountable on said sliding table and a second section fixedly mountable on said first section, wherein one of said first and second sections has a smooth surface to be brought into contact with the smooth surface of said timing belt and the other of said first and second sections has a surface formed with teeth to be meshable with the teeth of said timing belt.

* * * * *